United States Patent
Sonntag et al.

(10) Patent No.: US 9,335,145 B2
(45) Date of Patent: May 10, 2016

(54) APPARATUS AND METHOD FOR MEASURING THE THICKNESS OF A MEASUREMENT OBJECT

(75) Inventors: Achim Sonntag, Tiefenbach (DE); Gerhard Kirschner, Passau (DE); Herbert Fuellmeier, Egglham (DE); Franz Hochwimmer, Egglham (DE)

(73) Assignee: MICRO-EPSILON Messtechnik GmbH & Co. KG, Ortenburg (DE)

( * ) Notice: Subject to any disclaimer, the term of this patent is extended or adjusted under 35 U.S.C. 154(b) by 233 days.

(21) Appl. No.: 14/111,210

(22) PCT Filed: Mar. 27, 2012

(86) PCT No.: PCT/DE2012/200018
§ 371 (c)(1),
(2), (4) Date: Oct. 11, 2013

(87) PCT Pub. No.: WO2012/139571
PCT Pub. Date: Oct. 18, 2012

(65) Prior Publication Data
US 2014/0101954 A1    Apr. 17, 2014

(30) Foreign Application Priority Data

Apr. 15, 2011 (DE) .................. 10 2011 017 297
Jul. 15, 2011 (DE) .................. 10 2011 107 771

(51) Int. Cl.
*G01B 5/06* (2006.01)
*G01B 7/06* (2006.01)
(Continued)

(52) U.S. Cl.
CPC .. *G01B 5/06* (2013.01); *G01B 7/06* (2013.01); *G01B 7/087* (2013.01); *G01B 7/107* (2013.01);
(Continued)

(58) Field of Classification Search
CPC ........... G01B 5/06; G01B 7/023; G01B 11/06
USPC .......................................................... 33/545
See application file for complete search history.

(56) References Cited

U.S. PATENT DOCUMENTS 3,536,405 A    10/1970   Flower
5,001,356 A *  3/1991   Ichikawa ................. 250/559.27
(Continued)

FOREIGN PATENT DOCUMENTS

CN    101120230 A    2/2008
CN    100432625 C    11/2008
(Continued)

OTHER PUBLICATIONS

The International Bureau of WIPO, International Preliminary Report on Patentability (English Translation of ISA's Written Opinion) for International Application No. PCT/DE2012/200018, issued Oct. 15, 2013, 8 pages, Switzerland.
(Continued)

*Primary Examiner* — Yaritza Guadalupe-McCall
(74) *Attorney, Agent, or Firm* — Alston & Bird LLP (57) ABSTRACT

An apparatus for measuring the thickness of a measurement object, preferably a measurement object in the form of a web or piece goods, in a measuring gap, with a measuring mechanism which is fitted to a machine frame, wherein the measuring mechanism for measuring the thickness comprises one or more travel measurement sensor(s) aimed at the measurement object, is characterized in that a compensation sensor which is coupled to a travel measurement sensor measures the distance to a reference rule in order to detect and compensate for a change in the measuring gap, in that the reference rule is in the form of a side of a frame-shaped reference device integrated in the measuring mechanism, and in that the reference device is configured in such a manner that the distance between the reference rule and that side of the reference device which is opposite the reference rule is known during the thickness measurement. A corresponding method for measuring the thickness is also stated.

24 Claims, 6 Drawing Sheets

(51) Int. Cl.
*G01B 11/06* (2006.01)
*G01B 21/08* (2006.01)

(52) U.S. Cl.
CPC ............ *G01B 11/06* (2013.01); *G01B 11/0691* (2013.01); *G01B 21/08* (2013.01); *G01B 2210/44* (2013.01)

(56) References Cited

U.S. PATENT DOCUMENTS

| | | | |
|---|---|---|---|
| 5,210,593 A * | 5/1993 | Kramer | 356/631 |
| 5,247,253 A * | 9/1993 | Bowman | G01B 7/023 324/207.12 |
| 5,485,082 A * | 1/1996 | Wisspeintner et al. | 324/202 |
| 5,886,521 A * | 3/1999 | Hassan | 324/227 |
| 6,038,028 A * | 3/2000 | Grann et al. | 356/630 |
| 6,281,679 B1 * | 8/2001 | King et al. | 324/229 |
| 6,437,573 B1 * | 8/2002 | Golder et al. | 324/329 |
| 6,743,338 B2 | 6/2004 | Graeffe et al. | |
| 7,677,121 B2 | 3/2010 | Akiyama et al. | |
| 2005/0157314 A1 * | 7/2005 | Typpoe et al. | 356/630 |
| 2006/0132808 A1 | 6/2006 | Jasinski et al. | |
| 2009/0056412 A1 * | 3/2009 | Graeffe et al. | 73/1.81 |
| 2009/0260772 A1 * | 10/2009 | Alev et al. | 162/207 |
| 2010/0060270 A1 * | 3/2010 | Gong | H03K 17/9502 324/207.16 |
| 2014/0101954 A1 * | 4/2014 | Sonntag | G01B 7/06 33/545 |
| 2014/0198824 A1 * | 7/2014 | Nagl | G01K 1/20 374/163 |
| 2015/0362340 A1 * | 12/2015 | Montagne | G01D 5/225 324/207.17 |

FOREIGN PATENT DOCUMENTS

| | | |
|---|---|---|
| DE | 4220501 A1 | 1/1994 |
| DE | 4407215 A1 | 9/1995 |
| DE | 10060144 A1 | 6/2002 |
| EP | 0486713 A1 | 5/1992 |
| GB | 2217835 A | 11/1989 |
| JP | 2006-105878 A | 4/2006 |
| JP | 2007-046946 A | 2/2007 |
| WO | WO 2011/000665 A1 | 1/2011 |

OTHER PUBLICATIONS

International Searching Authority, International Search Report for International Application No. PCT/DE2012/200018, mailed Jul. 5, 2012, 7 pages, European Patent Office, The Netherlands.
International Searching Authority, Written Opinion for International Application No. PCT/DE2012/200018, mailed Jul. 5, 2012, 6 pages, European Patent Office, Germany.
State Intellectual Property Office of the P.R.C., First Office Action for Application No. 201280018020.0, Apr. 29, 2015, 27 pages, China.

* cited by examiner

Fig. 1

Prior art

APPARATUS AND METHOD FOR MEASURING THE THICKNESS OF A MEASUREMENT OBJECT

CROSS REFERENCE TO RELATED APPLICATIONS

This application is a national stage application, filed under 35 U.S.C. §371, of International Application No. PCT/DE2012/200018, filed Mar. 27, 2012, which claims priority to and the benefit of German Application No. 10 2011 017 297.1, filed Apr. 15, 2011, and German Application No. 10 2011 107 771.9, filed Jul. 15, 2011, the contents of all of which are hereby incorporated by reference in their entirety.

BACKGROUND

1. Technical Field

The invention relates to a device for measuring the thickness of a measurement object, the same for example having the shape of a sheet or cargo goods, in a measuring gap, by means of or via a measuring mechanism attached on a machine frame, wherein the measuring mechanism has one or more distance measurement sensors oriented toward the measurement object, for the purpose of measuring the thickness thereof.

In addition, the invention relates to a method for measuring the thickness of a measurement object, the same for example having the shape of a sheet or cargo goods, in a measuring gap, by means of or via a measuring mechanism attached on a machine frame, wherein the measuring mechanism orients one or more distance measurement sensors toward the measurement object, for the purpose of measuring the thickness thereof.

2. Description of Related Art

Devices and methods in the class have been known for years in practice, in many different embodiments. In the known devices and methods, a continuous thickness measurement is performed, for example on sheet materials, using a C- or O-shaped measurement mechanism and contactless measurement methods. For the purpose of measuring thickness in this case, optical sensors (triangulation sensors, confocal measuring techniques), eddy current sensors, capacitive sensors, ultrasound sensors, radiometric sensors (beta emitters), etc. are used. The thickness measurement typically takes place using two distance measurement sensors from both sides, against the material surface of a measurement object. The difference of the two measurement reading signals gives the thickness of the measured material if the distance between the two distance measurement sensors is known. When sheet material is the object being measured, traversing measurement methods are used, wherein both distance measurement sensors are moved as a pair transversally to the direction in which the sheet material is being transported.

Figure 1:
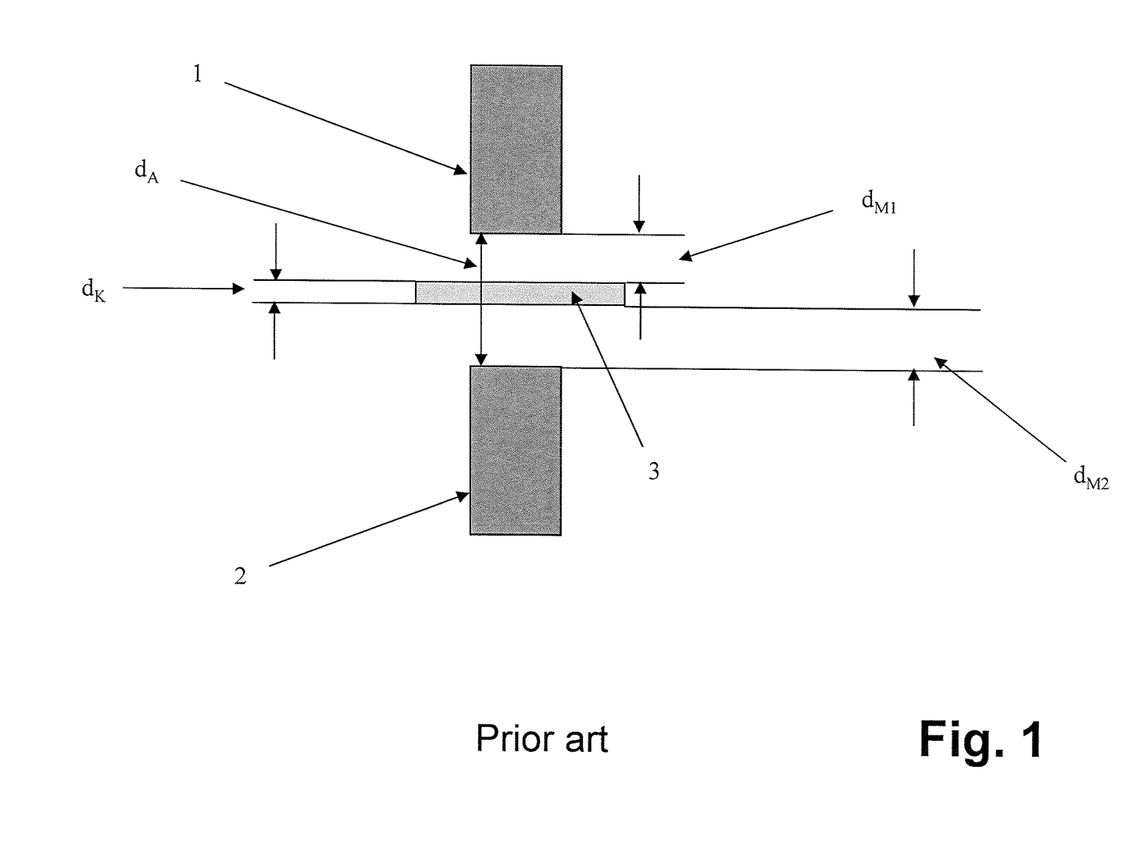
FIG. 1 shows a schematic view of a basic principle known from the prior art for measuring thickness and/or for calibrating, using two distance measurement sensors.

FIG. 1 shows a schematic illustration of the basic principle of differential thickness measurement and/or calibration, by means of two distance measurement sensors and a sensor- and calibration arrangement. The thickness d of a measurement object is determined by means of two distance measurement sensors 1 and 2, as thickness sensors, in that the distance of the two distance measurement sensors 1 and 2 from each other—the measurement gap $d_A$—is detected by means of a calibration part 3 with the predefined thickness $d_K$ (calibration part thickness) according to $$d_A = d_{M1} + d_{M2} + d_K$$

and subsequently the sum of the two measurement values $d_{M1}$ and $d_{M2}$ is subtracted from the measurement gap $d_A$ in a routine operation:

$$d = d_A - (d_{M1} + d_{M2})$$

The distance measurement sensors are integrated into C- or O-shaped measurement mechanism frames and are used in the industrial field. If no further precautions are taken in the construction of a device for measuring thickness, thermal changes in the surroundings affect the mechanical structure, particularly the measurement gap, $d_A$ and therefore the measurement result d.

In the case of small measurement mechanisms, the measurement mechanism can be made of a temperature-stable material. In the case of thickness measurement for cargo goods, the calibration part can be measured after each routine measurement, in order to eliminate the effect of the changes in the measurement gap.

However, in the case of thickness measurement for wide, sheet-shaped materials, particularly coils, inner liners, etc., the predefined distance between the two measurement sensors is critical. Particularly for the measurement of metallic strips in widths up to 1-2 m, or paper webs up to 6 m in width or more, it is particularly problematic that C-brackets and/or O-frames cannot be held in a mechanically stable manner over the width of the sheet material serving as the measurement object. As a result, the distance between the distance measurement sensors is not constant. Thus, when measurement precision in the micrometer range is required, even the smallest mechanical changes have an influence on the measured thickness reading. Such mechanical changes can occur as a result of vibrations, for example, or as a result of a longitudinal expansion due to temperature changes. As such, the distance between the distance measurement sensors is altered due to vibration or longitudinal expansion of the machine frame caused by thermal input. As an example, in the case of a machine frame made of V2A steel, with an expansion coefficient of 16 ppm/K, the distance between the two distance measurement sensors, given a change in temperature of 10° C. and a distance of 1 m between the distance measurement sensor mounted on an upper belt and the distance measurement sensor mounted on a lower belt, would change by 160 μm. As a result, for thickness measurements which commonly require precision within micrometers, it is not possible to make a precise measurement, due to the action of vibration and/or temperature. In the case of aluminum beams, which are frequently used in practice, an even larger change in distance occurs, because aluminum has a coefficient of expansion of 23 ppm/K.

To measure wide, sheet-like materials, particularly coils, inner liners, etc., a temperature-stable measurement mechanism could possibly be made exclusively using temperature-stable materials. However, the use of vibration-resistant or temperature-stable O-frames and/or C-frames, to prevent imprecision in measurement, demands a great deal of mechanical complexity and special materials, such as Invar®, for example, which results in considerable costs. In the measurement tasks indicated above, the distance measurement sensors would need to be moved over the material using linear axles. In addition, it is only possible to measure the calibration part in short intervals outside of the material sheet. As a result, it is not possible to detect and compensate a change in the measurement gap over the material.

In practice, a C-frame is known, wherein the distance measurement sensors are mounted on a glass plate having a minimal thermal expansion coefficient. However, this embodiment has the significant disadvantage that, in the case of a C-frame with long sides, the installation of the measurement sensors requires a great deal of time and effort. In addition, in the design using glass, it is very problematic that glass can brake very easily and is therefore not suited for use in rough industrial production applications.

In DE 42 20 501 A1, a method and a device are known for the optical thickness measurement of a sheet-like material, wherein for the purpose of avoiding mechanical complexity, the relative distance of each of the two distance measurement sensors is determined by means of a laser point projector. This laser point projector projects a laser beam in the direction of the movement of the distance measurement sensors. The two laser point projectors are attached in a temperature-stable and vibration-resistant holder made of Invar®, such that the relative positions of the laser sources with respect to each other remain as constant as possible. However, the known device has the problem that the optical sensors are not suited for industrial use in what is typically a rough production environment, because the optical sensors are subjected to vibrations, shock, contamination, etc. in this environment. In addition, it is difficult to precisely orient the lasers. A further disadvantage of the known device is that, as a result of the lasers being mounted on one side, even the smallest movements result in a misalignment of the beams, and this misalignment becomes larger as the sensors become farther from the beam source.

BRIEF SUMMARY

Therefore, the present invention addresses the problem of designing and realizing a device and a method for measuring the thickness of a measurement object, in the class named above, in such a manner that in industrial applications a robust measurement mechanism is ensured, which is suitable for industry and which provides high measurement precision, with constructively simple and cost-effective means.

The problem as stated above is addressed by the features of the broadest claims. According to the claims, the class-defined device for measuring thickness is characterized in that at least one compensation sensor which is coupled to a distance measurement sensor measures the distance to a reference guide, to detect and compensate a change in the measurement gap, in that the reference guide is designed as a side of a reference device, the same shaped as a frame and integrated into the measurement mechanism, and in that the reference device is designed in such a manner that during the thickness measurement, the distance between the reference guide and the side of the reference device which is opposite the reference guide is known.

The problem as stated above is also addressed by a method having the features of the broadest claims. According to the claims, the class-defined method is characterized in that at least one compensation sensor which is coupled to a distance measurement sensor measures the distance to a reference guide, in that a change in the measurement gap is detected and is compensated for on the basis of the measured distance between the compensation sensor and the reference guide, in that the reference guide forms one side of a reference device, the same having the shape of a frame and being integrated into the measurement mechanism, and in that during the thickness measurement, the distance between the reference guide and the side of the reference device which is opposite the reference guide is held constant or is measured.

It has been recognized according to the invention that it is enormously advantageous if a position change of the distance measurement sensors in space is compensated by means of a simple reference device. In this way, the measurement frame and/or the measurement mechanism could continue to be made of conventional materials, without strict requirements for stability and thermal expansion. A compensation sensor is advantageously included for this purpose and is coupled to a distance measurement sensor. The compensation sensor measures, for example continuously or in short intervals, the distance to a reference guide, in order to detect and to compensate for a position change in the distance measurement sensor, and therefore a change in the measurement gap, in this way. The reference guide in this case forms a measurement surface for the compensation sensor. In concrete terms, the reference guide is designed as one side of a reference device which is integrated into the measurement mechanism and which has the shape of a frame. In this case, the reference device is designed in such a manner that during the thickness measurement of a measurement object, the distance between the reference guide and the side of the reference device which is opposite the reference guide is known or is detected. Therefore, according to the invention, a position change of a distance measurement sensor is compensated when the distance between the reference guide and the side of the reference device opposite the reference guide is held constant or is measured.

As a result, a robust measurement mechanism suited for industry is ensured using constructively simple and cost-effective means, and providing high measurement precision for industrial applications. The device according to the invention and the method according to the invention can be used in thickness measurement for materials having the shape of a sheet, and/or in thickness measurement for cargo goods.

In addition, it is hereby noted that the reference device having the shape of a frame has the shape of a frame in the broadest possible sense. The reference device is not restricted to an embodiment as a fully closed frame which must necessarily have a continuous lateral beam.

The reference guide can consist of metal, or of other materials with high strength and minimal deformation; by way of example, CFK carbon fiber, GFK fiberglass, or ceramic materials or the like can be contemplated.

As regards an optimal geometry and a simple integration thereof into the measurement mechanism, the reference device can be designed with a substantially rectangular shape. As such, it is possible to install and/or integrate the same into the measurement mechanism in a simple and uncomplicated manner.

As regards a precise measurement, the compensation sensor can be designed as a capacitive sensor. As such, the compensation sensor possesses extremely high resolution, and therefore enables a very good compensation of even the smallest position changes of the distance measurement sensor and/or changes in the measurement gap.

In a particularly advantageous manner, the compensation sensor can be designed as an eddy current sensor. Eddy current sensors are not sensitive to oil, water, and dust in the measurement gap, and therefore can be used particularly in difficult environmental conditions in an effective and problem-free manner.

The use of further types of distance measurement sensors as the compensation sensor can also be contemplated in principle—for example the use of optical or magnetic sensors. In any case, for the deployment of the compensation sensors, it is particularly advantageous that the relative distance change between the traverse beam which bears the distance measurement sensor and the reference guide is usually very small. As a result, the compensation sensor only requires a small measurement range. In principle, the compensation sensor only needs to have a measurement range which is large enough to be able to detect the maximum deviation of the traverse beam during the measurement process. The deviation can result from bending, vibrations, or thermal expansion.

In one advantageous embodiment, the measurement mechanism can be designed in such a manner that distance measurement sensors are oriented toward the measurement object from both sides by the measurement mechanism, wherein a compensation sensor is coupled to one distance measurement sensor on each side of the measurement object. The two opposite sides of the reference device in this case can be designed as reference guides, on both sides of the measurement object, for each compensation sensor.

In a further advantageous manner, the reference device can have spacers made of a temperature-stable material, wherein the spacers connect the reference guides to each other in a rigid manner. As the temperature-stable material, ceramic or steel with a low coefficient of expansion can particularly be used, such as Invar®, Kovar®, Zeodur®, etc., for example. As such, the spacers function to prevent the distance between the reference guides from changing. As a result, it is not necessary for the reference device, the same having the shape of a frame, to be constructed entirely of a temperature stable material.

As an alternative, the reference device could also be made with spacers which are not made of temperature stable material. It would be necessary in this case to measure a known temperature profile of the material using a temperature sensor, and thereby to compensate a distance change between the reference guides using calculations.

In one particularly advantageous embodiment, the reference device can be fixed to the machine frame via a first spacer, and can have a floating mount on the machine frame via a second spacer. The fixed mount could be implemented using a bolt in the spacer, wherein the bolt is fixed in a U-shaped mount on the machine frame. The floating mount could be implemented via a roller bearing. As such, the reference guides are fixed on one side of the reference device which has the shape of a frame, and are only seated loosely on the other side, for example. In this way, tensioning of the reference guides as a result of thermal expansion is avoided, such that the reference guides are always free of tension.

As regards the prevention of a tensioning of the reference guides, the reference device can also be attached to the machine frame via one of the two reference guides, wherein the reference guide has a fixed mount on one of its sides, and a floating mount on its other side.

In a particularly advantageous manner, the compensation sensor can be arranged on the distance measurement sensor in such a manner that the measurement points of the compensation sensor and of the distance measurement sensor lie in a measurement axis. By way of example, if the compensation sensors are arranged on a traverse beam fixed with respect to the distance measurement sensors, and if the distance measurement sensors measure relative to the reference guides, then the compensation sensors can be oriented in the measurement axis flush with the distance measurement sensors.

In one concrete embodiment, the reference device can be attached to the machine frame via the two reference guides, wherein the reference guides have a fixed mount on one side and a floating mount on the other side. In this case, distance sensors continuously measure the distance between the two reference guides, or measure the same in short intervals. As such, a change in the distance between the two reference guides is detected, and can be used to compensate the measurement results during the measurement process. Measurement sensors can be used as the distance sensors. The measurement sensors can be connected to the first, for example upper reference guide via temperature stable spacers, and measure the distance change by contacting the second, for example lower reference guide.

In principle, other distance measurement sensors can be contemplated, the same being contactless sensors, for example, which can be attached on a temperature stable spacer having a low coefficient of expansion, and which measure the change in distance between the reference guides. The spacers also function so that a distance sensor can be used which has a small measurement range, and therefore a high absolute resolution. As such, the spacer makes it possible to reduce the effective measurement distance between the upper and lower reference guides, because it does not result in a change to the measured value by itself.

In an advantageous manner, a compensation sensor can be arranged on both sides of the distance measurement sensor, so that a tilting in the traversing direction is averaged out in the two measured values of the compensation sensors.

In one concrete embodiment, the measurement mechanism can orient one distance measurement sensor onto one side of the measurement object, wherein the measurement object lies on a contact surface, particularly a roller. The contact surface in this case can be designed as a part of the side of the reference device which lies opposite the reference guide. Distance sensors, particularly laser triangulation sensors, cable sensors, measurement sensors, etc. can be connected to the reference guide, for example via temperature stable spacers. The distance sensors in this case measure the distance between the reference guide and the contact surface.

In an advantageous manner, the distance sensors can measure relative to the reference surfaces, wherein the reference surfaces are arranged in such a manner that the distance between the reference surface and the reference guide is identical to the distance between the reference guide and the surface of the contact surface. The reference surface in each case can be arranged next to the contact surface. As such, it is possible to prevent wear on the measurement sensors, used as the distance sensors, when a roller is used as the contact surface. In an advantageous manner, the reference guide can be attached to the machine frame, wherein the reference guide has a fixed mount on one of its sides, and a floating mount on its other side.

As regards the thickness measurement for sheet materials, the distance measurement sensors can be moved perpendicularly to the measurement object by the measurement mechanism, by means of a traversing unit, particularly a linear axle, for the purpose of making a traversing measurement. The distance measurement sensors can be mounted on an upper belt, and optionally on a lower belt. In the case of a traversing measurement, then, the distance measurement sensors can be moved synchronously via a linear axle, perpendicularly to the sheet material—measurement object. It is possible to have lower requirements for the upper and lower belts as far as mechanical and thermal stability are concerns, because it is possible to compensate movements—which falsify the measurement result—during the measurement of the distance between the distance measurement sensors, by means of the compensation sensors and the reference guides.

The reference device can advantageously be calibrated by means of one or more calibration parts which have a predefined thickness, wherein the measurement gap, along with a compensation gap with is formed between the compensation sensor and the reference guide, is measured at multiple points, particularly continuously. As such, it is possible to calibrate the reference device which has the shape of a frame. The reference guide need not be perfectly oriented, because the erectness of the reference guides can be determined and saved by means of the calibration process.

In one further advantageous embodiment, the measurement gap can be detected again after each traverse, in a parked position. As such, it is possible to compensate for a thermal change in the mechanical coupling between the distance measurement sensor and the compensation sensor. If spacers are used which change as a result of thermal action, the expansion of the spacer is also detected in this step.

DETAILED DESCRIPTION OF THE DRAWINGS

At this point, there are various options for embodying and implementing the teaching of the present invention in an advantageous manner. For this purpose, reference is hereby made first to the claims, and second to the following description of an exemplary embodiment of the invention and to the drawing. In the context of the explanation of the exemplary embodiment of the invention and of the drawing, other generally exemplary embodiments and implementations of the teaching are explained as well, wherein:

DETAILED DESCRIPTION OF VARIOUS EMBODIMENTS

FIG. 1 shows a schematic illustration of the basic principle of differential thickness measurement and/or calibration known from the prior art, by means of two distance measurement sensors and a sensor- and calibration arrangement. Each of the distance measurement sensors 1 and 2 takes a measurement relative to the upper or lower surface of the measurement object. The thickness is found by subtracting from the measurement gap $d_A$ each measurement reading $d_{M1}$ and $d_{M2}$. The basic precondition for a correct thickness measurement reading is that the measurement gap $d_A$, meaning the distance between the two distance measurement sensors 1 and 2, remains constant. This could be achieved by a suitable suspension and guidance of the distance measurement sensors 1 and 2, which nevertheless means great time and effort in the selection of the materials (high-strength, temperature stable materials) and the construction.

It is substantially simpler, more cost-effective, and more precise if the distance itself is not kept constant, but rather is measured by means of compensation sensors, and is taken into account in the calculations of the thickness.

Figure 2:
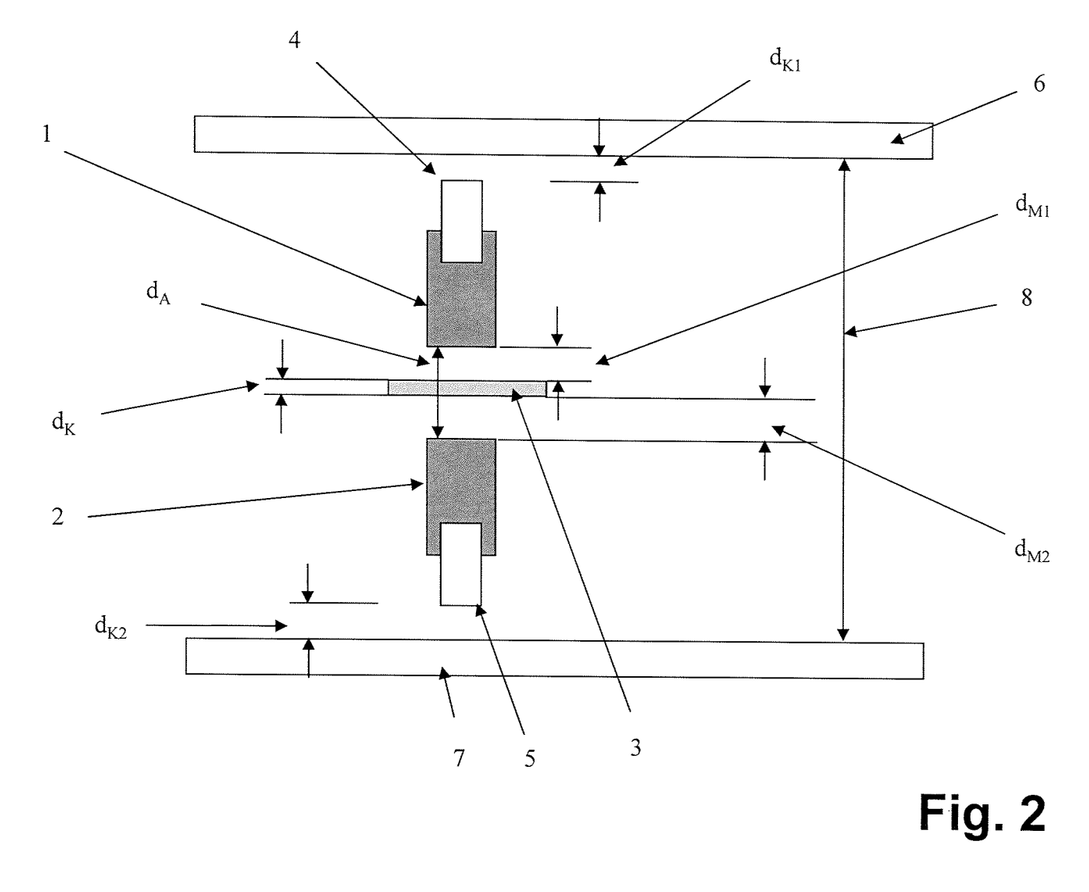
FIG. 2 shows a schematic view of one embodiment of a device according to the invention and of a method according to the invention.

FIG. 2 shows a schematic view of one embodiment of a device according to the invention and of a method according to the invention. Two distance measurement sensors 1 and 2 each measure the distance to the one surface of a measurement object and/or a calibration part 3, the same having the calibration part thickness $d_K$. A compensation sensor 4 is connected to the distance measurement sensor 1, and a compensation sensor 5 is connected to the distance measurement sensor 2. The compensation sensor 4 makes a measurement relative to the upper reference guide 6, and the compensation sensor 5 makes a measurement relative to the lower reference guide 7.

The reference guides 6 and 7 in FIG. 2 must have a constant distance 8, or at least a known distance 8. The distance 8 can be held constant by two round rods made of Invar®, for example. Invar® rods are mechanically stable, and have a very low coefficient of longitudinal expansion, such that the length thereof does not change, or changes only negligibly, even in response to changes in temperature.

The distance 8 shown in FIG. 2 could be measured, however, by two distance sensors, one on the left and one on the right side of the reference guides 6 and 7, by way of example, measuring the distance 8 between the reference guides 6 and 7 continuously or from time to time. As the distance sensors, laser triangulation sensors or cable sensors which have a sufficiently large measurement range could be used, for example. However, measurement sensors which are attached on the upper reference guide 6 by means of spacers made of Invar®, and which make a measurement relative to the lower reference guide 7, are more practical and more precise. A mechanically stable and temperature stable extension of the measurement sensors is achieved by means of the Invar® spacers, wherein the measurement sensors only need to possess a small measurement range as a result. As a result of the smaller measurement range, which in principle only needs to cover the expected distance changes of the reference guides, for example due to vibrations or thermal expansion in the machine frame [sic].

According to FIG. 2 $d_{M1}$ is the measurement reading of the upper distance measurement sensor 1 and $d_{M2}$ the measurement reading of the lower distance measurement sensor 2. As a result, with the thickness $d_K$ of the calibration part 3, the measurement gap $d_A$ can be found in the parked position, by:

$$d_A = d_K + d_{M1} + d_{M2}$$

In a first step, with a calibration part swiveled in, at n points, the values of the two compensation gaps $d_{K1,i}$ and $d_{K2,i}$ are measured and stored, together with the measurement gap $d_{A,i}$ using i=1, . . . , n.

In addition, from these values, the change in the measurement gap $\Delta d_A$ is determined using i=1, . . . , n in reference to the thickness in the parked position $d_A$. After each traverse, the value $d_A$ is detected again in the parked position, in order to compensate for the thermal change of the mechanical coupling between the distance measurement sensor and the compensation sensor. If spacers are used which change as a result of thermal action, the expansion of the spacer is also detected in this step. Using the value $\Delta d_A$, it is possible to recalculate the measurement gap across the entire traversing width. If the compensation measurement gaps are neglected, then the measurement gap $d_A$, at traverse t is found as follows:

$$\mathop{\forall}_{i=1}^{n} d_{A,i}(t) = d_A(t) + \Delta d_{A,i}$$

If there is a change in the linear guidance or the suspension thereof in the direction of the measurement gap, then the change is directly transferred to the signal of the compensation sensor. As such, there is a change in the signal $$\Delta d_{K1,i}(t) = d_{K1,i}(t-1) - d_{K1,i}(t),$$

and/or $$\Delta d_{K2,i}(t) = d_{K2,i}(t-1) - d_{K2,i}(t)$$

a traverse t. The measurement gap is therefore calculated across its entire width by:

$$\bigvee_{i=1}^{n} d_{A,i}(t) = d_A(t) + \Delta d_{A,i} + \Delta d_{K1,i}(t) + \Delta d_{K2,i}(t)$$

In this manner, the measurement gap is held constant by means of calculation. The thickness d of a measurement object at point i during the traverse t is found from:

$$d_i(t) = d_{A,i}(t) - (d_{M1,i}(t) + d_{M2,i}(t))$$

Figure 3:
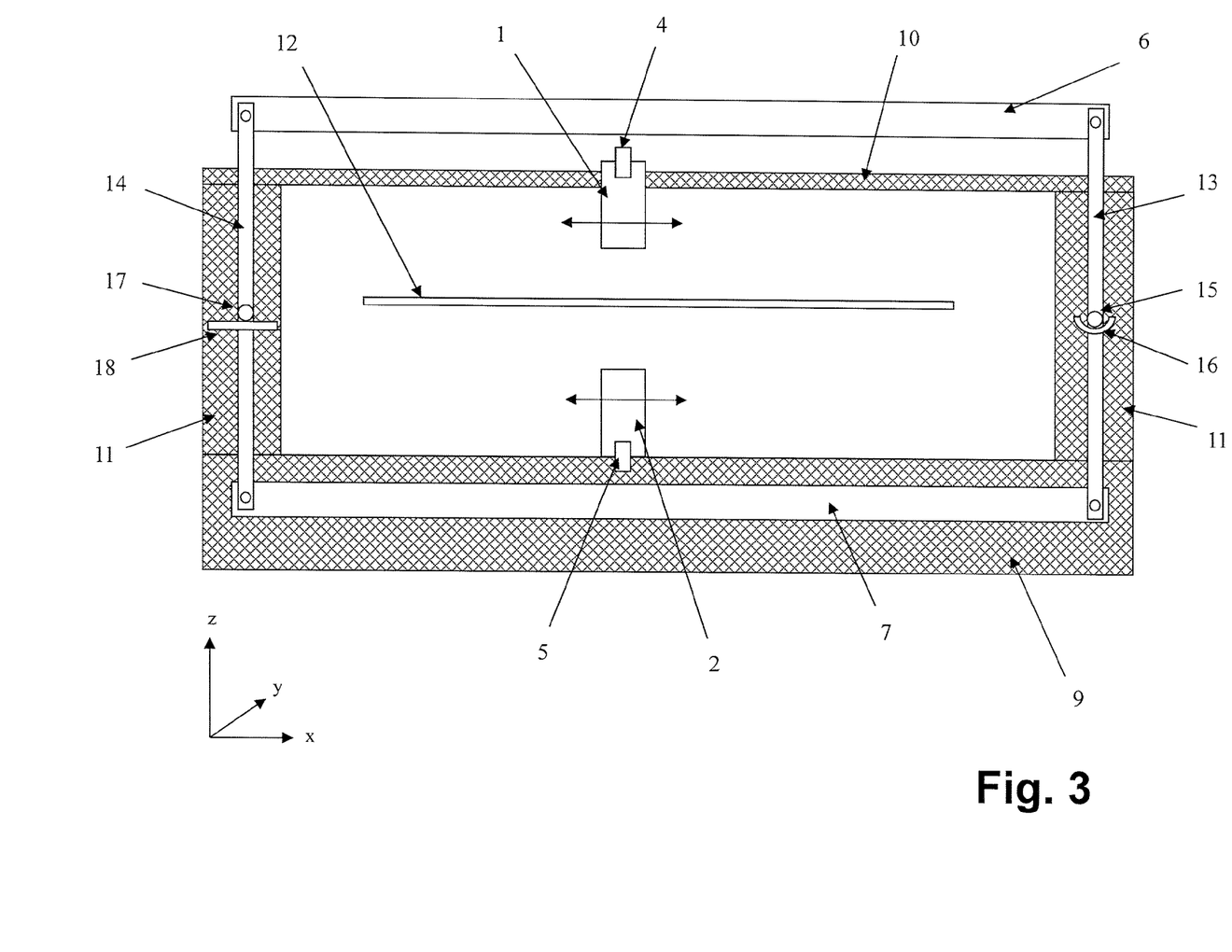
FIG. 3 shows a schematic view of a further embodiment of a device according to the invention, arranged in an O-frame.

FIG. 3 shows a schematic view of a further embodiment of a device according to the invention, which is integrated into an O-shaped machine frame. The machine frame has a machine bed 9, an upper belt 10, and two supports 11 which connect the machine bed 9 and the upper belt 10 to an O-frame. The machine frame consists of a simple, cost-effective steel construction, wherein no special measures have been taken for stiffening or temperature compensation—for example by using more expensive, more temperature stable materials. The reference guide 6 is arranged above, and the reference guide 7 below, the measurement object 12, and the two are rigidly connected to each other by means of spaces 13 and 14 in the form of Invar® profiles. Together with the two spacers 13 and 14, the reference guides 6 and 7 form the reference device, the same having the shape of a frame.

As a result of the rigid connection between the reference guides 6 and 7 via the spacers 13 and 14, the configuration prevents, or at least significantly minimizes, a longitudinal expansion resulting from temperature changes in the z direction. The reference guides 6 and 7 in FIG. 3 need not consist in this case of a material having a low longitudinal coefficient of expansion, because a longitudinal expansion of the reference guides 6 and 7 in the x direction is not incorporated into the thickness calculation of the measurement object 12. However, so that no mechanical tensions are created in the reference guides 6 and 7 as a result of longitudinal expansion, which could potentially lead to bending or twisting of the reference guides 6 and 7, and therefore to a falsification of a measurement reading, the reference guides 6 and 7 have a fixed mount on one side, and a floating mount on the other side. The fixed mount is implemented by a bearing pin 15 in the spacer 13, wherein the bearing pin 15 lies in a U-shaped mount 16—U-profile—on a support 11 of the machine frame. As a result, a movement of the reference device is prevented in the x direction, while a rotation about the y axis is enabled. On the other side of the reference device, the spacer 14 is mounted in a manner allowing movement in the x direction, by means of a roller bearing 17, which lies on a flat surface 18. As a result of this construction, tensions, vibrations, or longitudinal expansions of the machine frame which can potentially occur are not transmitted to the reference guides 6 and 7. As a result, the reference device, the same having the shape of a frame, is invariable in its geometry as a result of temperature, as long as the longitudinal change in the x direction does not change the distance between the reference guides in the z direction. Although the longitudinal change may occur in the x direction, it is not decisive for the thickness measurement.

In FIG. 3, the compensation sensors 4 and 5 are arranged on the traverse beam with the distance measurement sensors 1 and 2, fixed with respect to each other, and make measurements relative to the reference guides 6 and 7. The traverse beam has an upper belt 10 and a lower belt which is functionally assigned to the machine bed 9. So that tilting of the traverse beam does not have an influence on the measurement reading, the compensation sensors 4 and 5 are oriented flush against the distance measurement sensors 1 and 2 in the z axis, meaning that the measurement points of each of the measurement sensors and compensation sensors lie in an axis which is parallel to the z axis and substantially at a right angle to the traversing direction x.

Figure 4:
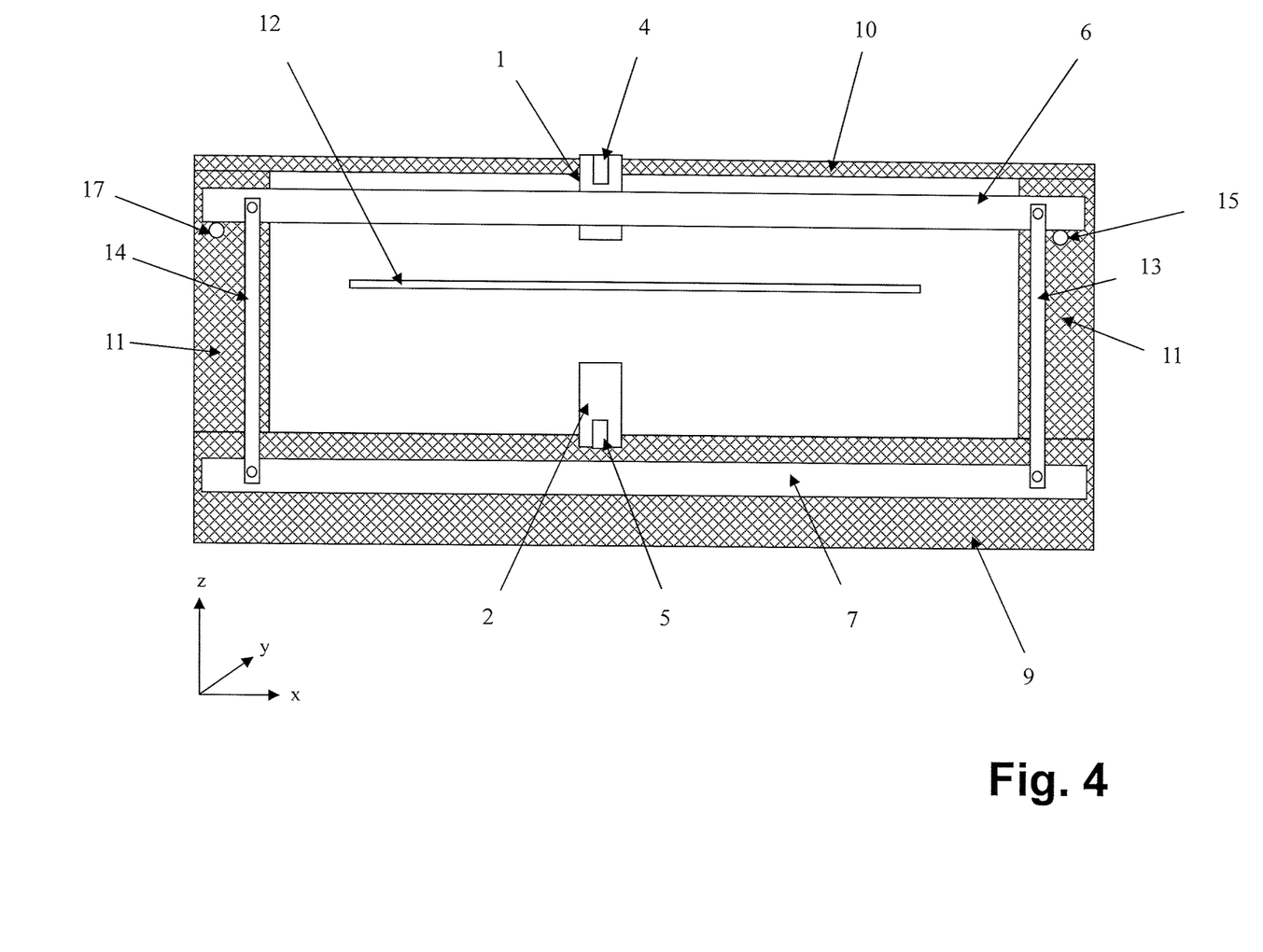
FIG. 4 shows a schematic view of a further embodiment of a device according to the invention, arranged in an O-frame.

FIG. 4 shows a schematic view of a further embodiment of a device according to the invention, arranged in an O-frame. In the embodiment according to FIG. 4, the two reference guides 6 and 7 are rigidly connected, as in the embodiment shown in FIG. 3, by means of temperature stable spacers. In contrast to the embodiment according to FIG. 3, only the upper reference guide 6 is connected to the machine frame. The attachment of the reference guide 6 to the machine frame is designed in such a manner that one side is mounted to rotate about a bearing pin 15, and the other side is mounted in a manner allowing movement, by means of a roller bearing 17. The lower reference guide 7 is suspended from the upper reference guide 6 via the spacers 13 and 14. In order to prevent a movement in the y direction, the two reference guides 6 and 7 are mounted, by means of ball bearings, in such a manner that the reference guides 6 and 7 are pressed against the ball bearings on the other side by means of a spring (not shown in FIG. 4). As a result, a stable guidance is achieved in the y direction, without any hindrance to a movement in the x direction or the z direction.

Figure 5:
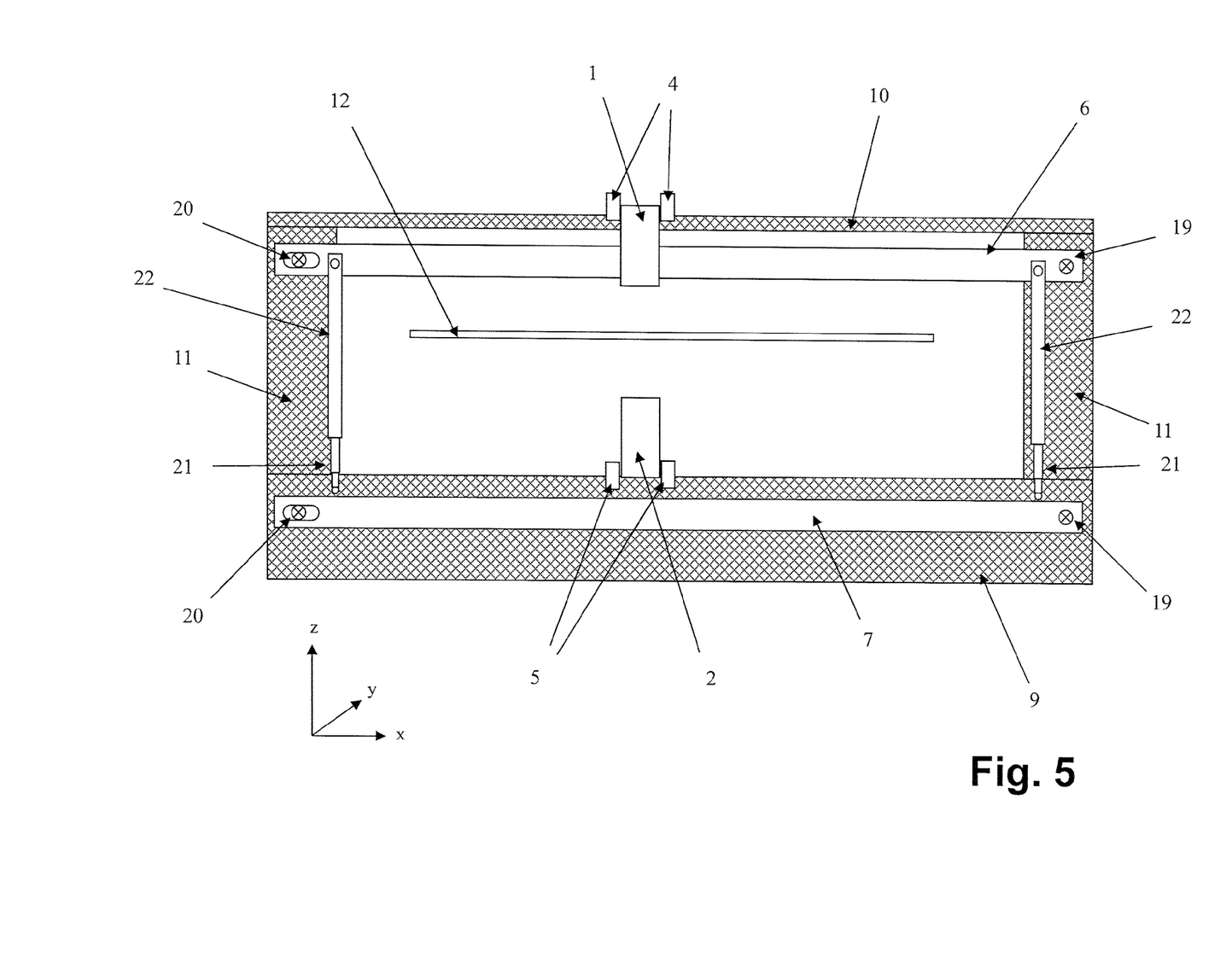
FIG. 5 shows a schematic view of a further embodiment of a device according to the invention.

FIG. 5 shows a schematic illustration of a further embodiment of a device according to the invention, for the purpose of measuring thickness. In the embodiment according to FIG. 5, the two reference guides 6 and 7 are not connected to each other with temperature stable spacers, but rather are mounted directly on the machine frame. A fixed mount 19, on one side of each of the reference guides 6 and 7, which can rotate about the y axis, has a bearing pin, while the other side of the reference guides 6 and 7 is realized by means of roller bearings 20 which can move in the x direction. Because in this construction the movements of the machine frame resulting from vibrations or thermal expansions are directly transmitted to the reference guides 6 and 7, the distance between the reference guides 6 and 7 must be measured. This is realized by means of two measurement sensors 21 as distance sensors, which are connected to the upper reference guide 6 via spacers 22 made of Invar®. The measurement sensors 21 measure the distance change by contacting the lower reference guide 7. In the embodiment according to FIG. 5, two compensation sensors 4 and/or 5 are used on each side of the distance measurement sensors 1 and 2. Because it is constructively not possible to have a flush arrangement, as in the embodiment in FIG. 3, two compensation sensors 4 are used to the left and right of the distance measurement sensor 1, and two compensation sensors 5 are used to the left and right of the distance measurement sensor 2 as a result. In this way, a tilting in the x direction is averaged out by the two measurement values of the compensation sensors 4 and/or 5.

Figure 6:
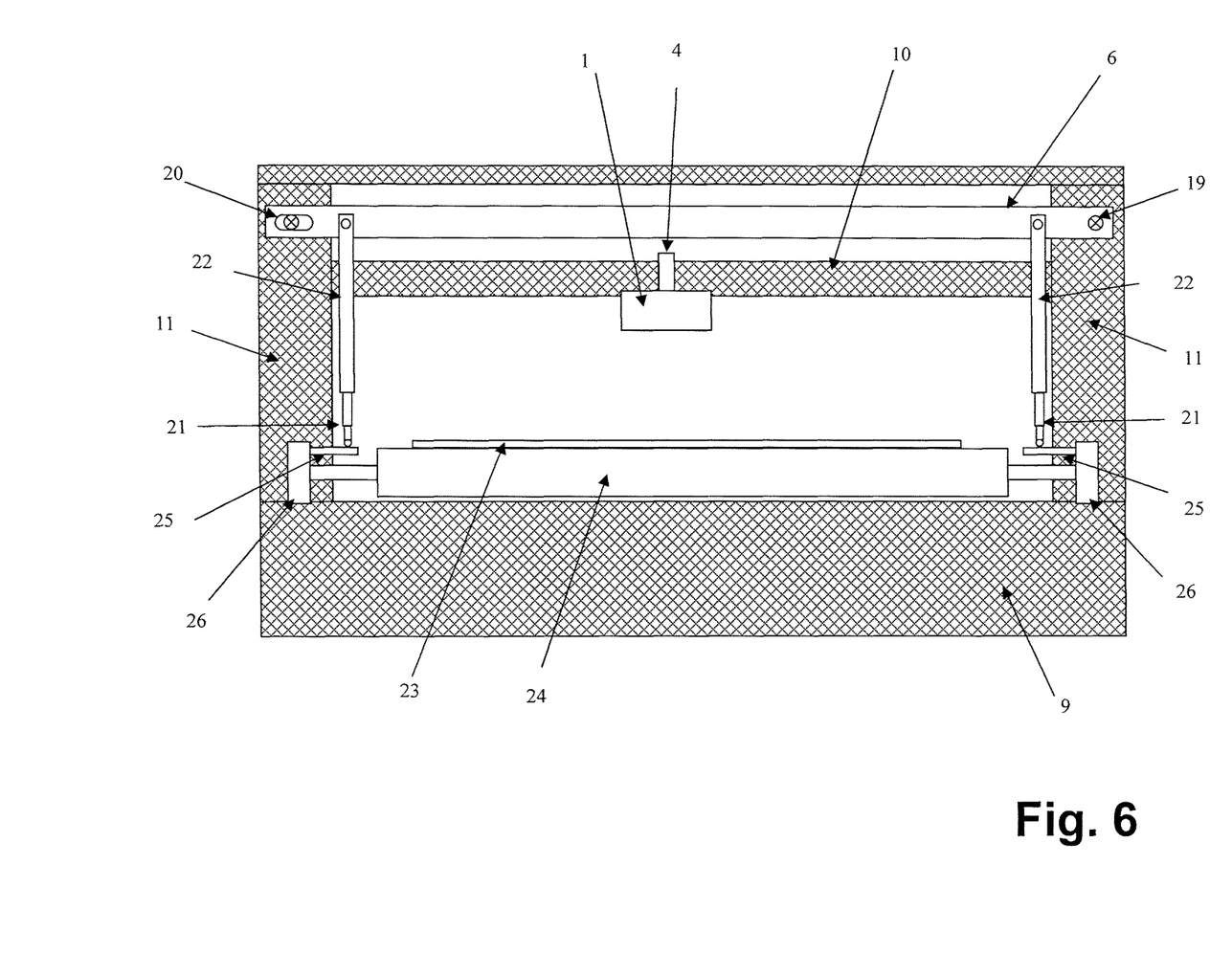
FIG. 6 shows a schematic view of one embodiment of a device according to the invention, having only one reference guide.

FIG. 6 shows a schematic view of one embodiment of a device according to the invention, having only one reference guide 6. The reference guide 6 is attached on one side thereof on the machine frame by a fixed mount 19 which can rotate about the y axis, by means of bearing pins. On its other side, the reference guide 6 is attached to the machine frame by means of roller bearings 20, in a manner allowing movement in the x direction.

In the embodiment in FIG. 6, the thickness measurement is carried out using only one distance measurement sensor 1 which is arranged above the measurement object 23. The distance measurement sensor 1 makes a measurement relative to the surface of the measurement object 23, for example a rolled material (steel, aluminum, etc.), or a plastic or rubber sheet. The known surface which the measurement object 23 contacts, for example a roller 24, represents the lower side of the measurement object 23.

The distance measurement sensor 1 can be a laser triangulation sensor. The advantage of the laser triangulation sensor is that it is possible to achieve a relatively large distance between the measurement object 23 and the distance measurement sensor 1 by means of the same. In this way, the distance measurement sensor 1 is protected from potential bulges or upwarp of the measurement object 23, which could damage the distance measurement sensor 1 as the result of process malfunctions. Upwarping can occur, by way of example, during the rolling of steel or aluminum at the start or the end of the belt. If the distance measurement sensor 1 were positioned close to the measurement object 23, it would be damaged by this upwarp.

Because the distance measurement sensor 1 is guided via an upper belt 10 of the machine frame, movements of the machine frame are directly transmitted to the measurement reading. With the compensation sensor 4, a measurement is made relative to the reference guide 6, which is likewise connected to the machine frame. So that movements of the machine frame do not have an effect on the measurement, the distance of the reference guide 6 to the roller surface is measured. This can be performed using measurement sensors 21, for example. Because the roller 24 rotates, and a direct measurement against the roller surface is not practical due to rapid wear on the measurement sensor 21, the measurement is made against two reference surfaces 25 to the left and right of the roller 24. The reference surfaces 25 are arranged in such a manner that the distance thereof to the reference guide 6 in the z direction is identical to the distance of the surface of the roller to the reference guide, meaning that the surfaces of the reference surfaces and the roller surfaces are arranged flush with each other.

Because the materials used for the roller 24, the bearing support 26 of the roller 24, and the reference surfaces 25 possess nearly identical longitudinal coefficients of expansion, no relative longitudinal changes occur in the z direction as a result of temperature changes. Instead of using reference surfaces and measurement sensors, measurements can also be made directly relative to the roller surface, by means of contactless sensors, for example on the edge of the roller 24 where the measurement object 23 does not cover the roller 24.

As regards further advantageous embodiments of the device according to the invention, reference is hereby made for the purpose of avoiding repetition to the general portion of the description and to the attached claims.

Finally, explicit reference is made to the fact that the exemplary embodiments of the device according to the invention described above are used only for explanation of the claimed teaching, but the teaching is not restricted to the exemplary embodiments.

REFERENCE NUMBER LIST

1 distance measurement sensor
2 distance measurement sensor
3 calibration part
4 compensation sensor
5 compensation sensor
6 reference guide
7 reference guide
8 distance between the reference guides
9 machine bed
10 upper belt
11 support
12 measurement object
13 spacer
14 spacer
15 bearing pin
16 bearing U-profile
17 roller bearing
18 flat surface
19 bearing pin which can rotate about the y axis
20 roller bearing which can move in the x direction
21 measurement sensor
22 spacer
23 measurement object
24 roller
25 reference surface
26 bearing support
$d_A$ measurement gap
$d_{M1}$ measurement value
$d_{M2}$ measurement value
$d_K$ (calibration part thickness
$d_{K1}$ compensation gap
$d_{K2}$ compensation gap

The invention claimed is:

1. A device for measuring, in a measurement gap ($d_A$), the thickness of a measurement object (12, 23), the device comprising:
    a measurement mechanism attached on a machine frame, wherein:
        the measurement mechanism has one or more distance measurement sensor(s) (1, 2) oriented toward the measurement object (12, 23);
        at least one compensation sensor (4, 5) coupled to at least one of the one or more distance measurement sensor(s) (1, 2), the at least one compensation sensor (4, 5) being configured to measure the distance to a reference guide (6, 7) for the purpose of detecting and compensating for a change in a measurement gap ($d_A$) of the measurement object (12, 23);
        the reference guide (6, 7) is configured as one side of a reference device that is integrated into the measurement mechanism; and
        the reference device comprises a frame configured such that during the thickness measurement the distance between the reference guide (6, 7) and the side of the reference device, which is opposite the reference guide (6, 7), is known by keeping constant or by measuring.

2. A device according to claim 1, wherein the reference device is substantially rectangular in shape.

3. A device according to claim 1, wherein the compensation sensor (4, 5) is a capacitive sensor.

4. A device according to claim 3, wherein the distance sensors comprise at least one of laser triangulation sensors, cable sensors, or measurement sensors.

5. A device according to claim 1, wherein the compensation sensor (4, 5) is an eddy current sensor.

6. A device according to claim 1, wherein:
    the measurement mechanism is configured such that the one or more distance measurement sensors (1, 2) are oriented toward both sides of the measurement object via the measurement mechanism;
    on both sides of the measurement object (12, 23), a compensation sensor (4, 5) is coupled to at least one of the one or more distance measurement sensors (1, 2); and
    the two opposite sides of the reference device on both sides of the measurement object are configured as reference guides (6, 7) for the compensation sensor (4, 5).

7. A device according to claim 6, wherein:
the reference device comprises spacers (13, 14) made of a temperature stable material; and
the spacers (13, 14) rigidly connect the reference guides (6, 7) to each other.

8. A device according to claim 7, wherein the temperature stable material comprises at least one of Invar®, Kovar®, or Zerodur®.

9. A device according to claim 6, wherein the reference device comprises:
a fixed mount on the machine frame via a first spacer (13); and
a floating mount on the machine frame via a second spacer (14).

10. A device according to claim 6, wherein:
the reference device is attached to the machine frame via one of the two reference guides (6, 7); and
the reference guide (6, 7) comprises a fixed mount on one of its sides and a floating mount on another of its sides.

11. A device according to claim 6, wherein:
the reference device is attached to the machine frame via both reference guides (6, 7);
the reference guides (6, 7) comprise a fixed mount on one side and a floating mount on the other side; and
the distance sensors measure the distance between the two reference guides (6, 7).

12. A device according to claim 11, wherein a compensation sensor (4, 5) is arranged on each side of the distance measurement sensor (1, 2).

13. A device according to claim 1, wherein the compensation sensor (4, 5) is arranged on the distance measurement sensor (1, 2) in such a manner that the measurement points of the compensation sensor (4, 5) and of the distance measurement sensor (1, 2) lie in a measurement axis.

14. A device according to claim 1, wherein:
the measurement mechanism orients the distance measurement sensor (1) toward one side of the measurement object (12, 23);
the measurement object (12, 23) lies on a contact surface, particularly a roller (24);
the contact surface is designed as a part of the side of the reference device which is opposite the reference guide (6);
distance sensors are connected to the reference guide (6) via temperature stable spacers (13, 14); and
the distance sensors measure the distance between the reference guide (6) and the contact surface.

15. A device according to claim 14, wherein:
the distance sensors make a measurement relative to a reference surface (25); and
the reference surface (25) is configured such that that the distance between the reference surface (25) and the reference guide (6) is identical to the distance between the reference guide (6) and the surface of the contact surface.

16. A device according to claim 1, wherein:
the reference guide (6) is attached to the machine frame; and
the reference guide (6) comprises a fixed mount on one of its sides and a floating mount on its other side.

17. A device according to claim 1, wherein the measurement object has the shape of at least one of a sheet or cargo goods.

18. A method for measuring, in a measurement gap ($d_A$), the thickness of a measurement object (12, 23) said method using a device according to claim 1 and comprising the steps of:
providing said device, wherein:
a measurement mechanism is attached to a machine frame; and
one or more distance measurement sensor(s) (1, 2) are oriented toward the measurement object (12, 23) for the purpose of the thickness measurement;
measuring the distance to a reference guide (6, 7) by means of at least one compensation sensor (4, 5) coupled to a distance measurement sensor (1, 2); and
detecting and compensating for a change in the measurement gap (dA) using the measured distance between the compensation sensor (4, 5) and the reference guide (6, 7),
wherein:
the reference guide (6, 7) forms one side of a reference device comprising a frame;
the reference device is integrated into the measurement mechanism; and
during the thickness measurement the distance between the reference guide (6, 7) and the side of the reference device which is opposite the reference guide (6, 7) is known by keeping constant or by measuring.

19. A method according to claim 18, wherein the distance measurement sensors (1, 2) are moved perpendicularly to the measurement object (12, 23) by the measurement mechanism, by means of a traversing unit for the traversing measurement.

20. A method according to claim 19, wherein the traversing unit is a linear axle.

21. A method according to claim 18, wherein:
the reference device is calibrated using a calibration part (3) having a predefined thickness; and
at multiple points the measurement gap ($d_A$) and a compensation gap ($d_{K1}$, $d_{K2}$), which is formed between the compensation sensor (4, 5) and the reference guide (6, 7), are measured.

22. A method according to claim 18, wherein after each traverse, the measurement gap (dA) is detected again in a parked position.

23. A method according to claim 18, wherein the measurement object has the shape of at least one of a sheet or cargo goods.

24. A method according to claim 18, wherein the measurement gap ($d_A$) and the compensation gap ($d_{K1}$, $d_{K2}$) are measured in a continuous manner.

* * * * *